US006970521B2

(12) United States Patent
Dosho

(10) Patent No.: US 6,970,521 B2
(45) Date of Patent: Nov. 29, 2005

(54) CIRCUIT AND SYSTEM FOR EXTRACTING DATA

(75) Inventor: Shiro Dosho, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 891 days.

(21) Appl. No.: 09/741,086

(22) Filed: Dec. 21, 2000

(65) Prior Publication Data
US 2001/0005156 A1 Jun. 28, 2001

(30) Foreign Application Priority Data
Dec. 24, 1999 (JP) ............... 11-366183

(51) Int. Cl.[7] .......... H04L 27/06; H03L 7/00; H03H 11/16
(52) U.S. Cl. .......... 375/340; 327/161; 327/237
(58) Field of Search .......... 375/340, 354, 375/371–373; 327/291, 152–261; 348/537

(56) References Cited

U.S. PATENT DOCUMENTS

| | | | |
|---|---|---|---|
| 4,386,323 A | | 5/1983 | Jansen |
| 4,814,879 A | | 3/1989 | McNeely |
| 5,046,075 A | | 9/1991 | Kraemer et al. |
| 5,475,715 A | * | 12/1995 | Hase et al. .......... 375/354 |
| 5,594,762 A | | 1/1997 | Joo et al. |
| 5,636,254 A | * | 6/1997 | Hase et al. .......... 375/371 |
| 5,887,040 A | | 3/1999 | Jung et al. |
| 5,907,655 A | * | 5/1999 | Oguro .......... 386/94 |
| 6,118,319 A | * | 9/2000 | Yamada et al. .......... 327/291 |
| 6,465,076 B2 | * | 10/2002 | Larson et al. .......... 428/143 |
| 6,563,888 B1 | * | 5/2003 | Toriyama .......... 375/340 |

FOREIGN PATENT DOCUMENTS

| | | |
|---|---|---|
| JP | 3-171945 | 7/1991 |
| JP | 3-204251 | 9/1991 |
| JP | 4-301941 | 10/1992 |
| JP | 5-252227 | 9/1993 |
| JP | 8-84137 | 3/1996 |
| JP | 8-97807 | 4/1996 |
| JP | 11-41220 | 2/1999 |
| JP | 11-68727 | 3/1999 |
| JP | 11-177540 | 7/1999 |
| JP | 11-215110 | 8/1999 |
| WO | WO 99/22482 | 5/1999 |

OTHER PUBLICATIONS

"10ps Jitter 2 Clock Cycle Lock Time CMOS Digital Clock Generator Based on an Interleaved Synchronous Mirror Delay Scheme," by Saeki et al., 1997 Symposium on VLSI Circuits Digest of Technical Papers, pp. 109-110.

* cited by examiner

Primary Examiner—Amanda T. Le
Assistant Examiner—Cicely Ware
(74) Attorney, Agent, or Firm—McDermott Will & Emery LLP

(57) ABSTRACT

A data extracting circuit extracts data much more accurately at a much higher response speed. A clock transfer section propagates an input clock signal through unit delay devices thereof. An edge detecting section locates an edge of the clock signal, which edge is being propagated through the clock transfer section, for a time represented by a given edge of an input data signal. In response to an edge detection signal indicating the clock signal edge located, a clock selecting section selects one of outputs of the delay devices, and presents the output as a clock input to a latch.

11 Claims, 17 Drawing Sheets

CIRCUIT AND SYSTEM FOR EXTRACTING DATA

BACKGROUND OF THE INVENTION

The present invention relates to improving the data extraction technique for use in a communications system or recording system.

Data extraction is one of various signal-processing techniques applicable to communications and recording systems. The data extraction technique is exploited to accurately extract data either from received data that has been transmitted through a communications channel or from a signal that has been read out from another component in a given system.

As shown in FIG. 16, a data extracting circuit 100 for a communications system extracts a train of read clock pulses, which are synchronized with received data, from the received data, and also outputs a train of read data pulses synchronously with the clock pulse train. In a recording system on the other hand, the data extracting circuit 100 obtains the read data from a signal that has been read out from a recorder, not from the received data.

Ideally, the received data or read signal should have a completely square waveform. Actually, though, the data or signal is often received as a sine wave, rather than a square wave. This is because the waveform is possibly affected by distortion, phase noise or filtering effects resulting from inconstant state transitions over a signal path or clock jitter observed at the time of transmission. Also, the data or signal often has its eye pattern narrowed due to phase noise, for example. A QAM or QPSK system of today, in particular, has an even narrower eye pattern.

Accordingly, the data extraction technique should be developed so that received data can be latched and read out at a best timing when its eye pattern expands most. Supposing the period at which the received data is transferred is T, the best timing the eye pattern expands most is usually delayed from the instant the received data changes its level (which will be herein referred to as a "transition point") by T/2.

FIG. 17 illustrates a schematic configuration for a known data extracting circuit. As shown in FIG. 17, a phase-locked loop (PLL) circuit 110 has been used widely as a circuit for realizing the data extraction. The PLL circuit 110 includes phase comparator 111, charging pump circuit 112, low-pass filter (LPF) 113 and voltage-controlled oscillator (VCO) 114. Clock pulses, output from the VCO 114, are provided as read clock pulses. A latch 120 latches input data synchronously with the edges of the read clock pulses and then outputs the latched data as read data. According to the currently available circuit technology, the PLL 110 accomplishes phase locking at a point in time delayed from the transition point of the input data by T/2.

In actuality, however, noise often enters the charging pump circuit 112. Thus, it is difficult to realize phase locking for the PLL 110 at the instant delayed by T/2.

Hereinafter, it will be described with reference to FIGS. 18A and 18B how the charging pump circuit 112 should and does actually operate. FIG. 18A illustrates its ideal operation that is not affected by noise, while FIG. 18B illustrates its actual operation that is affected by noise.

When the PLL circuit 110 accomplishes phase locking, the phase comparator 111 outputs two types of pulses of the same width as upper and lower pulses for the VCO 114. Accordingly, in the ideal state illustrated in FIG. 18A, the upper and lower current sources of the charging pump circuit 112 have the same current value, and the integrated value of the output currents becomes zero. As a result, no phase shift is caused once phase locking has been accomplished.

In actuality, as shown in FIG. 18B, power supply or ground noise is likely superposed and the upper and lower current sources of the charging pump circuit 112 have mutually different current values as being affected by the noise. Accordingly, even when the PLL circuit 110 accomplishes phase locking and the phase comparator 111 outputs the two types of pulses of the same width as the up- and down-pulses, the integrated value of the output currents of the charging pump circuit 112 does not become zero. As a result, the oscillation frequency of the VCO 114 deviates. That is to say, phase locking is accomplished to cancel the effects of the noise, i.e., so that the up- and down-pulses are not output synchronously but at mutually different times. This means that phase shift has been caused by the noise. In that case, the data extracting circuit cannot latch the received data at the best time, delayed from the transition point of the data by T/2, and has its performance deteriorated.

Also, the PLL is a feedback circuit. Accordingly, in extracting data, its response time is also restricted by the response time of the feedback circuit. For that reason, it is usually difficult to extract data quickly enough.

SUMMARY OF THE INVENTION

It is therefore an object of the present invention to provide a data extracting circuit that can extract data much more accurately at a much higher response speed.

Specifically, an inventive data extracting circuit includes clock transfer section, edge detecting section, clock selecting section and latch. The clock transfer section includes multiple unit delay devices connected in series together and propagates an input clock signal through the delay devices. The edge detecting section locates an edge of the clock signal and outputs an edge detection signal indicating the clock signal edge located. The edge, which is being propagated through the clock transfer section, should be found for a time represented by a given edge of an input data signal. Responsive to the edge detection signal, the clock selecting section selects one of the outputs of the delay devices. And the latch receives the output, selected by the selecting section, and the data signal as clock and data inputs, respectively, and outputs read data.

According to the present invention, an edge detecting section locates an edge of an input clock signal. The edge, which is being propagated through a clock transfer section, should be found for a time represented by a given edge of an input data signal. Then, responsive to an edge detection signal indicating the clock signal edge located, a clock selecting section selects one of the outputs of the delay devices. And the selected output is presented as a clock input to a latch. Accordingly, the instant the data signal changes its level, the clock signal can be timed to the level transition. As a result, data can be extracted with very good responsiveness.

Another inventive data extracting circuit includes clock transfer section, edge detecting section, first and second groups of switches, selected clock transfer section, first and second data transfer sections and latch. The clock transfer section includes multiple unit delay devices connected in series together and propagates an input clock signal through the delay devices. The edge detecting section locates an edge of the clock signal and outputs an edge detection signal indicating the clock signal edge located. The edge, which is being propagated through the clock transfer section, should be found for a time represented by a given edge of an input data signal. The first group of switches are provided for the respective delay devices. Responsive to the edge detection signal, each said switch of the first group selectively delivers the output of associated one of the delay devices. The selected clock transfer section includes multiple unit transfer gates that are connected in series together and that receive the outputs of the respective switches of the first group. The first data transfer section also includes multiple unit transfer gates connected in series together, and propagates the input data signal through the transfer gates thereof. The second group of switches are provided for the respective transfer gates of the first data transfer section. Responsive to the edge detection signal, each said switch of the second group selects the output of associated one of the transfer gates. The second data transfer section also includes multiple unit transfer gates that are connected in series together and that receive the outputs of the respective switches of the second group. And the latch receives an output of the second data transfer section and an output of the selected clock transfer section as data and clock inputs, respectively, and outputs read data.

An inventive data extracting system includes data extracting circuit, PLL circuit, FIFO memory and read enabling means. The data extracting circuit may be designed according to any of the embodiments of the present invention. The PLL circuit receives the data signal, which is also input to the data extracting circuit, and generates and delivers the clock signal to the data extracting circuit. The FIFO memory receives the read data and a read clock signal, which have been output from the data extracting circuit, as its input data and input clock signal, respectively. The read enabling means monitors a phase locking state of the PLL circuit. And when the PLL circuit accomplishes the phase locking, the read enabling means delivers the clock signal, which has been generated by the PLL circuit, as an output clock signal to the FIFO memory.

Another inventive data extracting system includes data extracting circuit, quartz oscillator, FIFO memory and read enabling means. The data extracting circuit may be designed according to any of the embodiments of the present invention. The quartz oscillator generates and delivers the clock signal to the data extracting circuit. The FIFO memory receives the read data and a read clock signal, which have been output from the data extracting circuit, as its input data and input clock signal, respectively. The read enabling means counts the number of pulses of the clock signal generated by the quartz oscillator. When the count reaches a predetermined number, the read enabling means delivers the clock signal, generated by the quartz oscillator, as an output clock signal to the FIFO memory.

BRIEF DESCRIPTION OF THE DRAWINGS

FIG. 18A illustrates an ideal operation that is not affected by noise; and

FIG. 18B illustrates an actual operation that is affected by noise.

DESCRIPTION OF THE PREFERRED EMBODIMENTS

Embodiment 1

Figure 1:
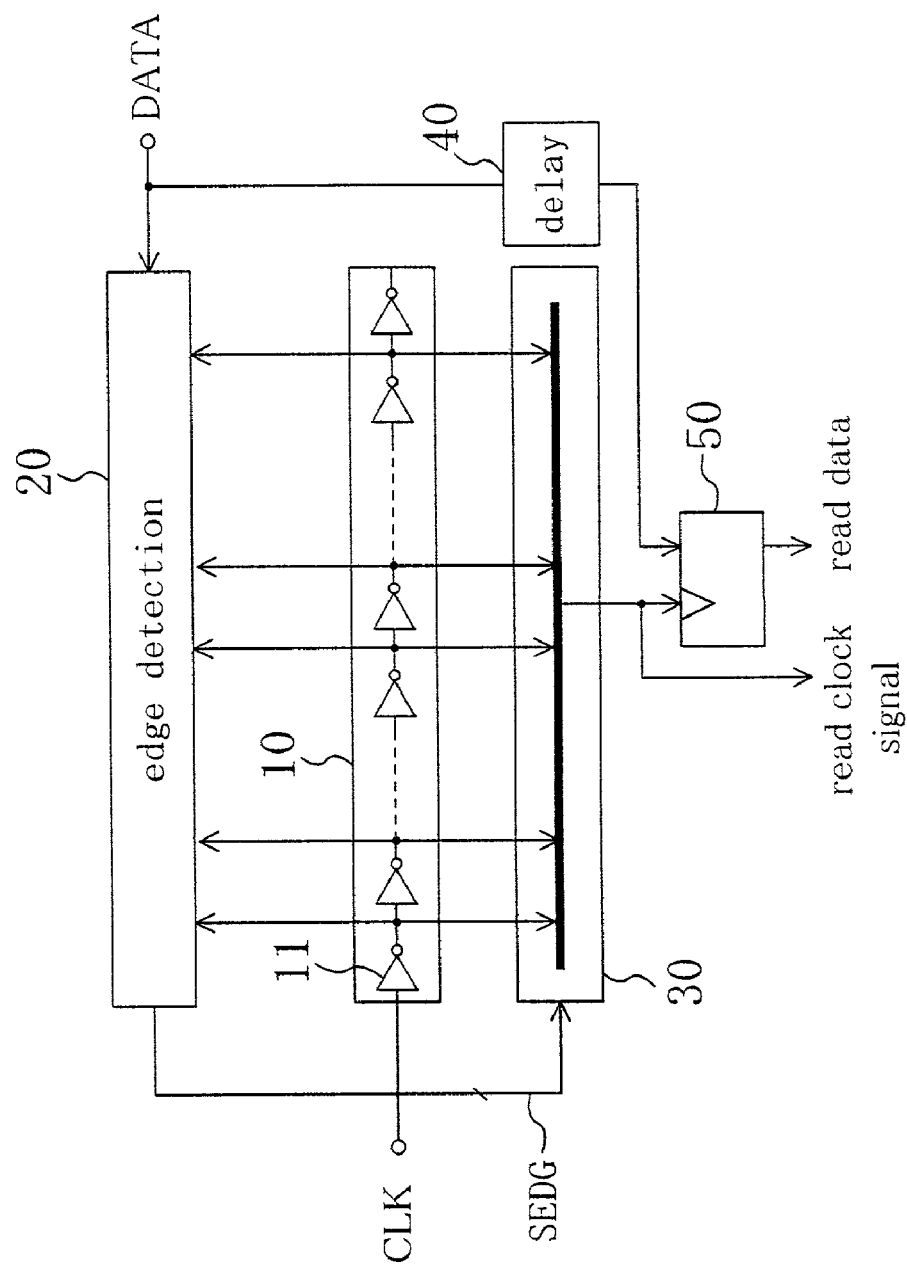
FIG. 1 is a block diagram illustrating a schematic configuration for a data extracting circuit according to a first embodiment of the present invention.

FIG. 1 illustrates a schematic configuration for a data extracting circuit according to a first embodiment of the present invention. As shown in FIG. 1, the circuit includes clock transfer section 10, edge detecting section 20, clock selecting section 30, delay circuit 40 and latch 50. The clock transfer section 10 includes multiple unit delay devices 11, which are connected in series together, and propagates an input clock signal CLK through the delay devices 11. Receiving the outputs of the respective delay devices 11 in the transfer section 10, the edge detecting section 20 locates an edge of the clock signal CLK and outputs an edge detection signal SEDG. The edge of the clock signal CLK should be located for one of the outputs of the delay devices 11. Responsive to the edge detection signal SEDG, the clock selecting section 30 selects the output of the delay device 11 for which the clock signal edge has been located. The delay circuit 40 delays an input data signal DATA for a predetermined amount of time. The latch 50 receives the output of the delay circuit 40 and the output signal, which has been selected by the clock selecting section 30, as its data and clock inputs, respectively. The output data of the latch 50 is provided as read data. And the output signal, selected by the clock selecting section 30, is output as a read clock signal.

The known data extracting circuit is implemented as a feedback circuit utilizing a phase-locked loop. Accordingly, if input data changes its phase faster than the operating speed of the feedback circuit, then the known extracting circuit cannot always catch up with this phase shifting. That is to say, the known extracting circuit cannot always latch the input data at the best time (i.e., the instant delayed from the transition point of the data by a half period).

In contrast, the data extracting circuit of this embodiment realizes instantaneous response, which has been hard for the known extracting circuit to achieve, by performing feed-forward operations instead of the feedback operations utilizing the PLL. Specifically, by storing the transition patterns of the clock signal CLK on the clock transfer section 10 and by instantaneously locating the edge of the clock signal CLK being propagated through the transfer section 10, the data signal DATA can be latched at the best time. That is to say, the signal latched is delayed from the edge of the data signal DATA by a half period. Accordingly, data can be latched much more accurately and much faster at the best time the eye pattern expands most. It should be noted, however, that this embodiment is naturally implementable while using a configuration including a PLL as well.

Figure 2:
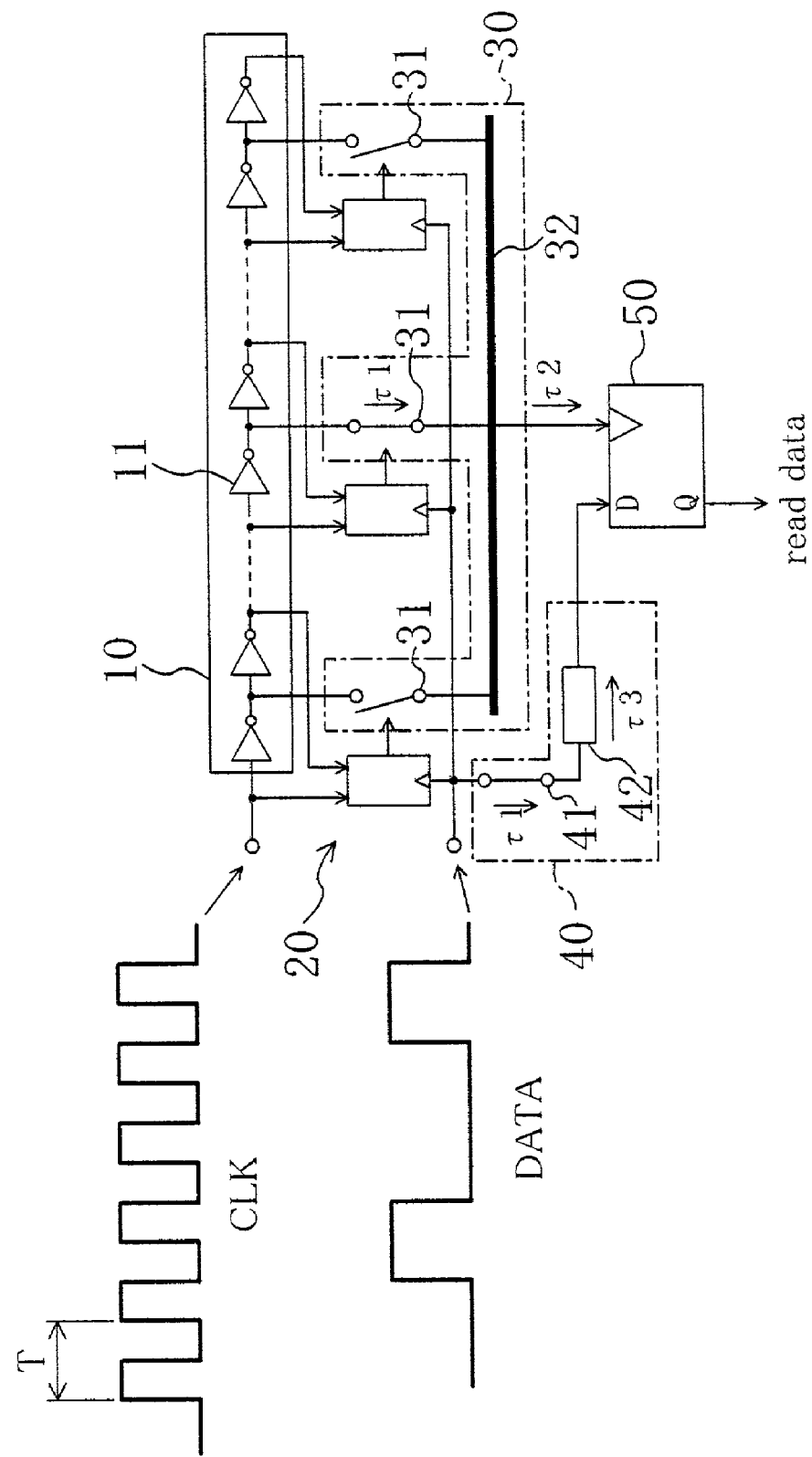
FIG. 2 illustrates how the circuit shown in FIG. 1 operates.

FIG. 2 illustrates how the data extracting circuit of the first embodiment operates. In the example illustrated in FIG. 2, the clock transfer section 10 is supposed to delay the input clock signal CLK for at least the period at which the data signal DATA changes its level. It is also supposed that the clock signal CLK falls at one or more outputs of the delay devices 11 in the clock transfer section 10.

The edge detecting section 20 locates a trailing edge of the clock signal CLK, which is substantially synchronized with an associated leading edge of the data signal DATA, at one of the outputs of the delay devices 11 in the clock transfer section 10. The instant the edge detecting section 20 locates the trailing edge of the clock signal CLK, the clock selecting section 30 selects the clock signal CLK and then outputs the signal CLK as an activating clock signal to the latch 50. The data signal DATA, on the other hand, is delayed by the delay circuit 40 for an amount of time substantially equal to the time needed for propagating the clock signal CLK from the output of the delay device 11 to the input of the latch 50. And then the delayed data signal DATA is input to the latch 50. The delay circuit 40 includes a switch 41 and a delay device 42. In this case, the switch 41 causes a delay that is equal in length to the delay caused by each of switches 31 provided for the clock selecting section 30.

The latch 50 is herein supposed to latch the data signal DATA synchronously with a leading edge of the activating clock signal and the duty cycle of the clock signal CLK is herein supposed to be 50%. In this case, a time T1 that should pass from the instant the edge detecting section 20 located the trailing edge of the clock signal CLK for the leading edge of the data signal DATA to the instant the leading edge of the clock signal CLK reaches the clock input of the latch 50 is given by:

$$T1 = T/2 + \tau 1 + \tau 2 \qquad (1)$$

where T is the period of the clock signal CLK, τ1 is the time delay caused by the switch 31, 41 and τ2 is the time delay caused by a selector 32 provided for the clock selecting section 30.

On the other hand, a time T2 that should pass from the instant the edge detecting section 20 located the trailing edge of the clock signal CLK for the leading edge of the data signal DATA to the instant the leading edge of the data signal DATA reaches the data input of the latch 50 is given by:

$$T2 = \tau 1 + \tau 3 \qquad (2)$$

where τ3 is the time delay caused by the delay device 42.

In this case, supposing τ2=τ3, the difference in length between the times T1 and T2 is T/2. Then, it is not until T/2 has passed after the leading edge of the data signal DATA reached the data input of the latch 50 that the activating clock signal for the latch 50 rises. That is to say, the data signal DATA can always be latched at the best time, i.e., a point in time delayed from the transition of the data signal DATA by T/2.

In addition, the data can be latched with the best time delayed by T/2 located at an interval equal to one clock cycle time. That is to say, the data extraction technique of this embodiment is much less likely to be affected by high-speed phase shifting or phase jitter, for example. As can be seen, this embodiment takes advantage of the principle of feed-forward response, thereby realizing a data extracting circuit that can instantaneously cope with phase shifting of data and can reduce the bit error rate.

Figure 3:
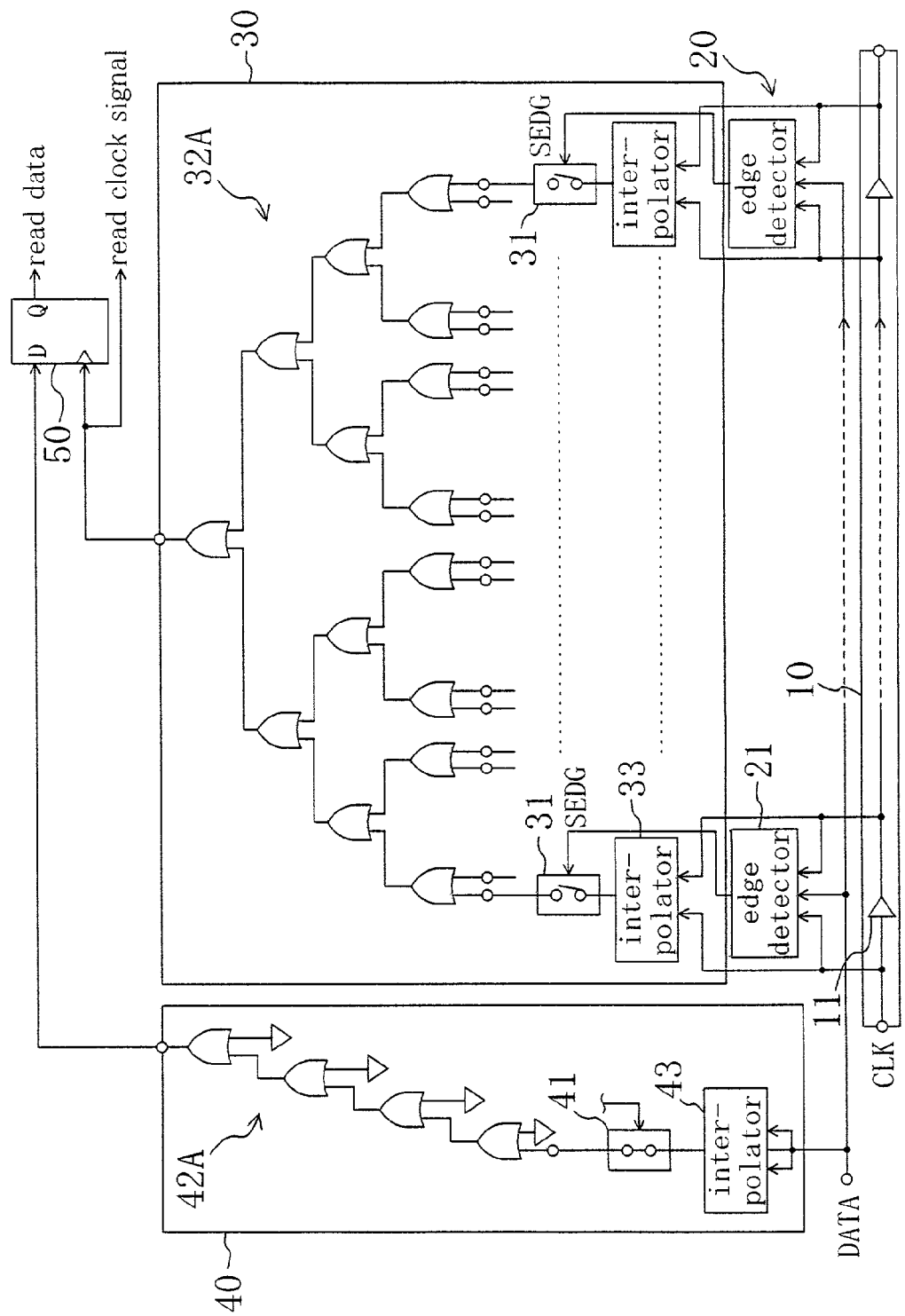
FIG. 3 illustrates a specific configuration for the circuit shown in FIG. 1.

FIG. 3 illustrates a specific configuration for the data extracting circuit of the first embodiment. In FIG. 3, each of the delay devices 11 for the clock transfer section 10 is easily implementable as a circuit with a two-stage connection of inverters or as a differential inverter circuit, for example.

The edge detecting section 20 is made up of multiple edge detectors 21 provided for the respective delay devices 11. Each of the edge detectors 21 latches the input and output signal levels of the associated delay device 11 every time the data signal DATA rises. And if the detector 21 has found the input and output levels latched different from each other, then the detector 21 knows that the detector 21 has located an edge of the clock signal CLK.

Figure 4:
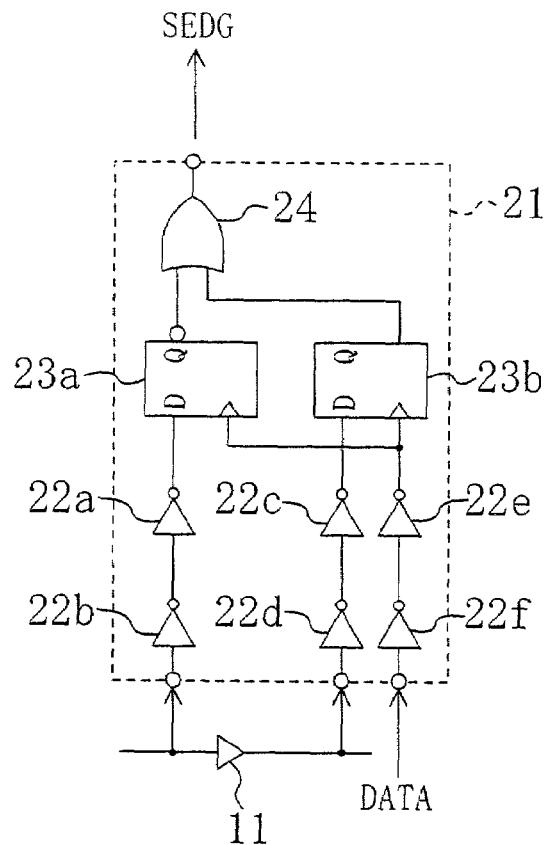
FIG. 4 illustrates a specific configuration for the edge detector shown in FIG. 3.

FIG. 4 illustrates a specific configuration for the edge detector 21. In FIG. 4, the inputs to the edge detector 21, i.e., the input and outputs signal levels of the associated delay device 11 and the data signal DATA, are buffered by inverters 22a through 22f so as to be shaped into signals with sufficiently sharp edges. Responsive to the data signal DATA presented as their clock signal, D flip-flops 23a and 23b latch the input and output signal levels of the delay device 11, respectively. The inverted output of the D flip-flop 23a and the non-inverted output of the D flip-flop 23b are input to an AND gate 24. And the output of the AND gate 24 is provided as the edge detection signal SEDG. By providing the edge detector 21 shown in FIG. 4 for each delay device 11, the trailing edge of the clock signal CLK, which should be found somewhere in the clock transfer section 10, can be located easily.

Referring back to FIG. 3, the clock selecting section 30 includes: multiple switches 31, which are provided for the respective delay devices 11; and an OR gate tree 32A in which multiple OR gates are connected together like a tree. If the time delays from the output terminals of the switches 31 to the output terminal of the clock selecting section 30 are constant, then the data signal DATA cannot be latched at the same time but at mutually different times depending on where the clock signal CLK has passed. In that case, the data signal DATA has its phase modulated unintentionally. To avoid this problem, the OR gate tree 32A is provided according to this embodiment so that a constant time delay is caused between the output terminal of each switch 31 and the output terminal of the clock selecting section 30.

As shown in FIG. 3, multiple signal interpolators 33 are also provided for the respective delay devices 11. Each signal interpolator 33 obtains an interpolated signal from the input and output signals of the associated delay device 11, and then outputs the interpolated signal as a clock signal at an intermediate time between those of the input and output signals. And the interpolated signal is input to the associated switch 31. The edge detection signal SEDG, output from the associated edge detector 21, is also input as a switch control signal to the switch 31. When the edge detection signal SEDG indicates the edge detection, the switch 31 is ready to transfer the interpolated signal received to the OR gate tree 32A.

Figure 5:
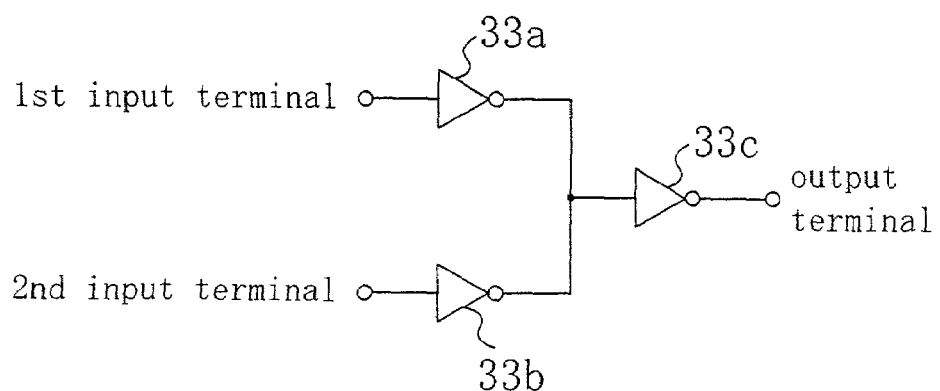
FIG. 5 illustrates a configuration for the signal interpolator shown in FIG. 3.

FIG. 5 illustrates a configuration for the signal interpolator 33. As shown in FIG. 5, the interpolator 33 is easily implementable as a connection of three inverters 33a through 33c. The interpolators 33 are not always needed to carry out the present invention. However, it is believed that when the edge detector 21 detects the trailing edge of the clock signal CLK, the edge of the clock signal CLK is located between the input and output terminals of the associated delay device 11. Accordingly, if the interpolator 33 is provided, then a signal with an edge even closer to the actual trailing edge of the clock signal CLK can be used as the read clock signal for the latch 50. As a result, the data can be extracted even more accurately.

As already described with reference to FIG. 2, the delay circuit 40 should delay the data signal DATA for an amount of time equal to the time needed for the clock signal CLK to reach the latch 50, i.e., a time delay caused by the selecting section 30. For that reason, the delay circuit 40 shown in FIG. 3 includes a serial connection of switch 41, OR gate bank 42A and signal interpolator 43, which have the same configurations as the switch 31, OR gate tree 32A and signal interpolator 33, respectively.

By utilizing the circuit configurations illustrated in FIGS. 3 through 5, the data extracting circuit of the first embodiment is easily realizable.

Embodiment 2

In the circuit configuration shown in FIG. 3 for the first embodiment, the OR gate tree 32A is provided for the clock selecting section 30 to considerably reduce the variation in delay between the outputs of the switches 31 and the output of the clock selecting section 30. However, the chip area occupied by the OR gate tree 32A will increase approximately in proportion to the square of the number of input signals, generally speaking. Accordingly, if a data extracting circuit with a higher time resolution should be implemented using the configuration shown in FIG. 3, then the chip area required will rise almost exponentially.

Figure 6:
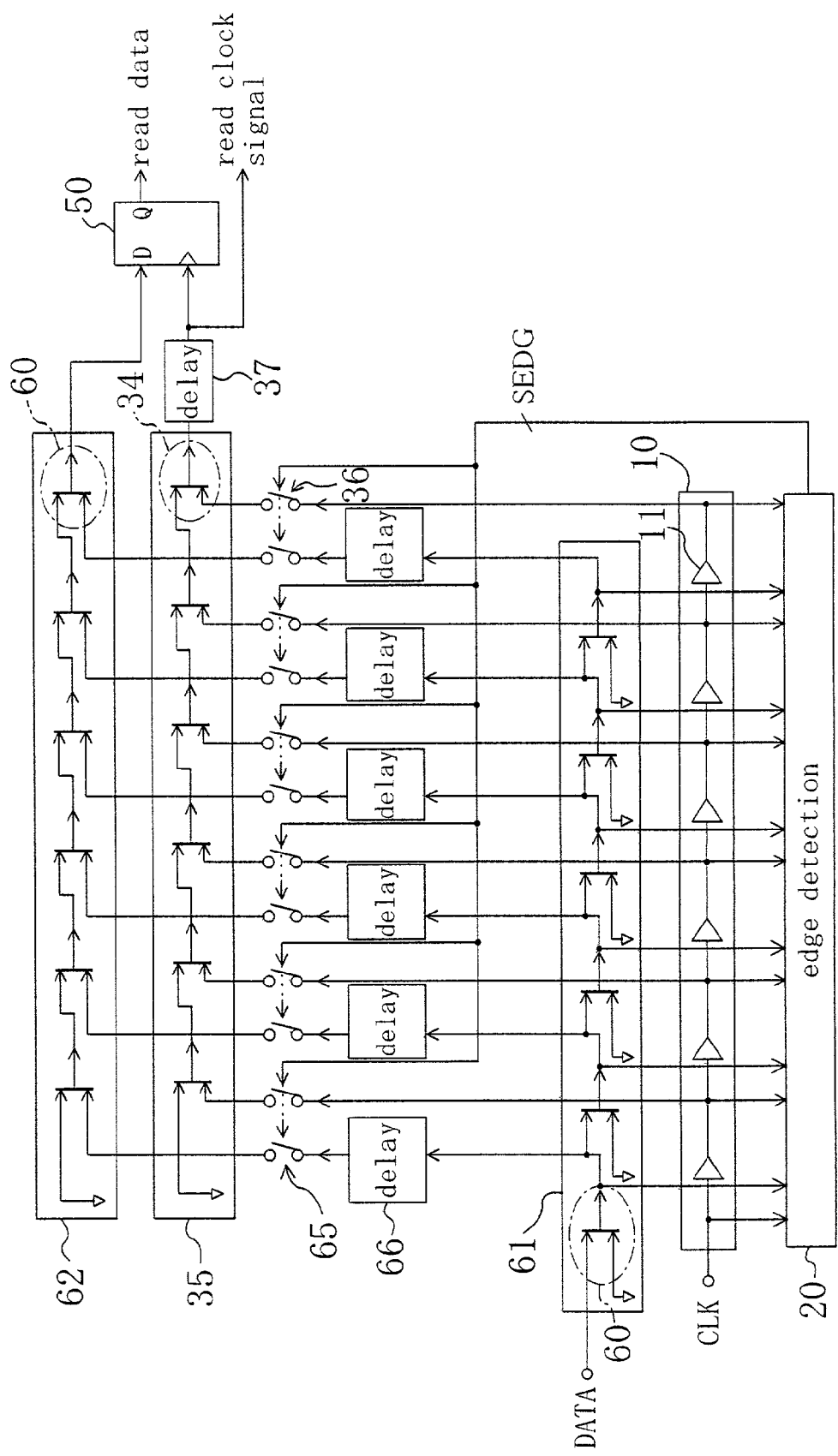
FIG. 6 is a circuit diagram illustrating a configuration for a data extracting circuit according to a second embodiment of the present invention.

FIG. 6 is a circuit diagram illustrating a configuration for a data extracting circuit according to a second embodiment of the present invention. In the configuration shown in FIG. 6, the clock signal CLK, which has been selected by the clock transfer section 10, is not transferred through the OR gate tree 32A but through a selected clock transfer section 35. As shown in FIG. 6, the selected clock transfer section 35 is made up of multiple unit signal transfer gates 34 connected in series together. And the extracting circuit of the second embodiment further includes a second data transfer section 62 for adjusting the delays of the data and clock signals DATA and CLK appropriately. The second data transfer section 35 is also implemented as a serial connection of unit signal transfer gates 60, each having the same configuration as the transfer gates 34 for the selected clock transfer section 35. A first data transfer section 61, which is also implemented as a serial connection of the transfer gates 60, is further provided to reduce the variation in input time of the data and clock signals DATA and CLK. In this manner, the extracting circuit is so constructed as to cause a constant time delay between the presentation of the data signal DATA to the circuit and its arrival at the latch 50, no matter which path the signal DATA has taken.

Figure 7:
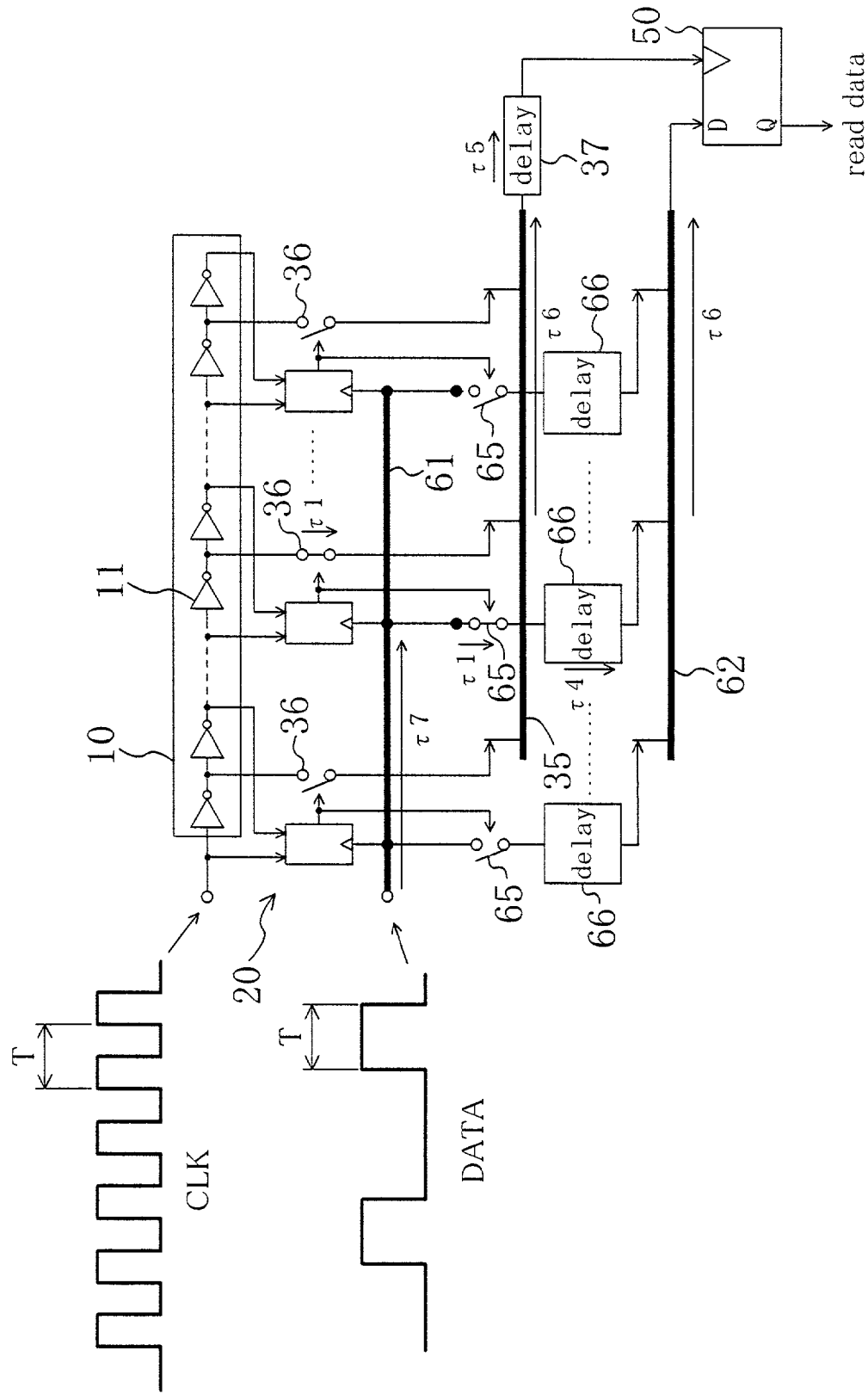
FIG. 7 illustrates how the circuit shown in FIG. 6 operates.

FIG. 7 illustrates how the data extracting circuit of the second embodiment operates. As in the first embodiment, the clock signal CLK is input to the clock transfer section 10. Every time the data signal DATA rises, the edge detecting section 20 latches the input and output signal levels of the associated delay device 11 in the clock transfer section 10. And if the detecting section 20 has found the input and output levels different from each other, then the section 20 knows that an edge of the clock signal CLK has been located. Supposing the duty cycle of the clock signal CLK is 50%, a time T3 needed for propagating the data signal DATA to the latch 50 is given by:

$$T3 = \tau1 + \tau4 + \tau6 \qquad (3)$$

where $\tau1$ is a time delay caused by a switch 65 of a second group (which is equal to that caused by each switch 36 of a first group), $\tau4$ is a time delay caused by a delay device 66 and $\tau6$ is a time delay caused by the second data transfer section 62 (which is equal to that caused by the selected clock transfer section 35).

On the other hand, a time T4 needed for transferring the leading edge of the clock signal CLK from the clock transfer section 10 to the latch 50 by way of the switch 36 of the first group, selected clock transfer section 35 and delay circuit 37 is given by:

$$T3 = \tau1 + \tau5 + \tau6 + T/2 \qquad (4)$$

where $\tau5$ is a time delay caused by the first delay circuit 37. In this case, supposing $\tau5 = \tau4$, the clock signal CLK is delayed from the data signal DATA by T/2 as in the first embodiment. Then, it is not until T/2 has passed after the leading edge of the data signal DATA reached the data input of the latch 50 that the activating clock signal for the latch 50 rises. That is to say, the data signal DATA can always be latched at the best time, i.e., a point in time delayed from the transition point of the data signal DATA by T/2.

Furthermore, supposing $\tau7$ is a time that should pass between the presentation of the leading edge of the data signal DATA to this extracting circuit and the detection of the trailing edge of the clock signal CLK, a time T5 needed for the data signal DATA, input to this extracting circuit, to reach the latch 50 is given by:

$$T5 = T3 + \tau7 = \tau1 + \tau4 + \tau6 + \tau7 \qquad (5)$$

In this case, $(\tau1 + \tau4)$ is constant. Thus, if $(\tau6 + \tau7)$ can be made constant, the time T5 will always be constant no matter which path the data signal DATA takes.

As shown in FIG. 6, wherever the data signal DATA passes (i.e., no matter which of the switches 65 is turned ON), the data signal DATA passes the same number of stages (i.e., seven stages in FIG. 6) of transfer gates 60 in the first and second data transfer sections 61 and 62. This means that the sum $(\tau6 + \tau7)$ can be made constant easily. That is to say, according to the second embodiment, the time T5 needed for the input data signal DATA to reach the latch 50 can be kept constant even if the signal DATA has changed its propagation paths.

Accordingly, the time delay of the data signal DATA is always constant and the time delay of the clock signal CLK, synchronized with this data signal DATA, is also always constant. And the signals cannot have their phases modulated due to the circuit configuration. As a result, the clock signal can be extracted stably.

Figure 8:
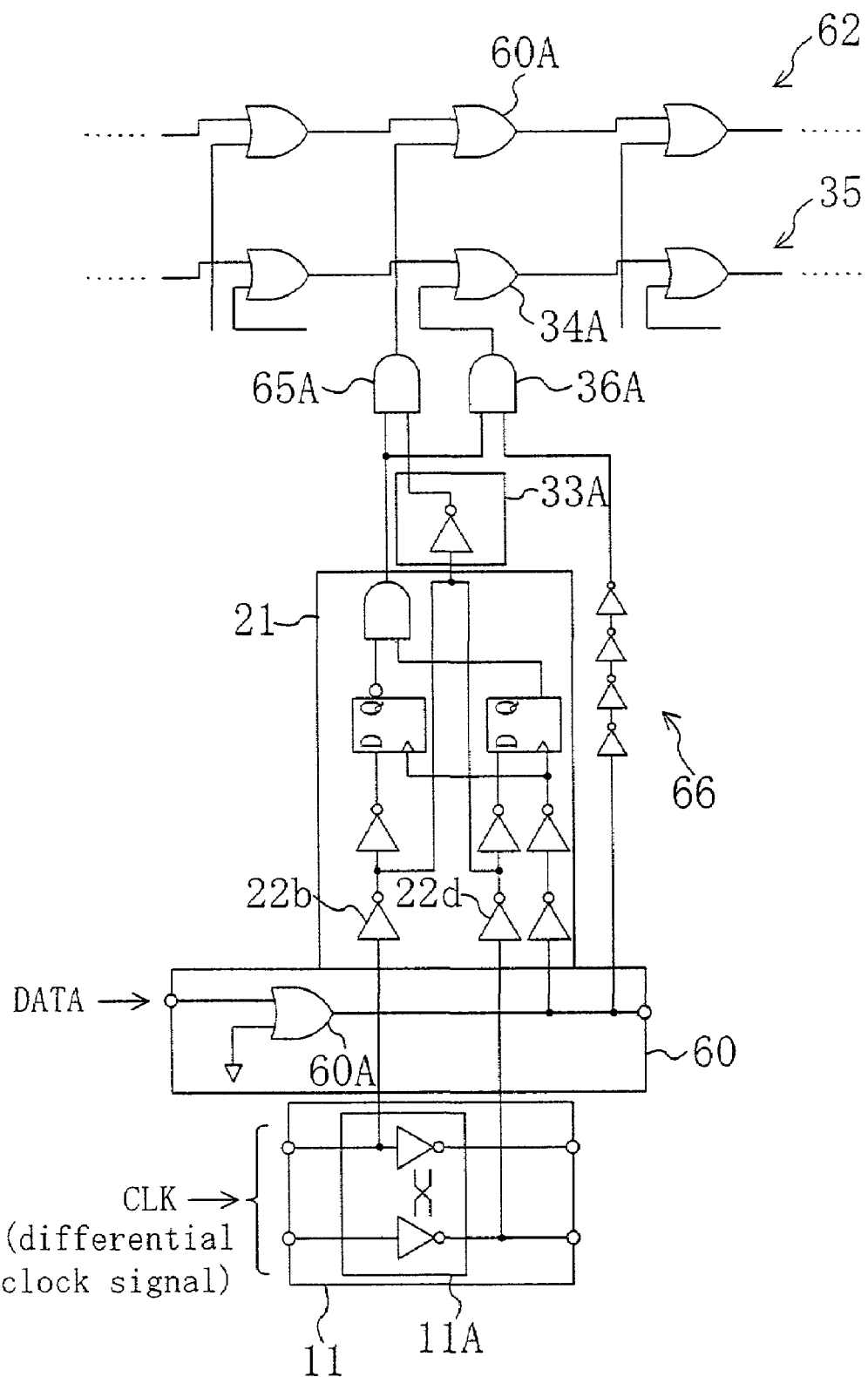
FIG. 8 illustrates a specific configuration for each unit block of the circuit shown in FIG. 6.

FIG. 8 illustrates a specific configuration for each unit block of the data extracting circuit shown in FIG. 6. According to the second embodiment, just by cascading the unit blocks shown in FIG. 6 together, the data extracting circuit is implementable easily. Accordingly, when the circuit is actually realized as an LSI, the circuit needs a reduced chip area and can be laid out easily.

In the configuration shown in FIG. 8, the input clock signal CLK is a differential clock signal. Each of the delay devices 11 for the clock transfer section 10 is implemented as a differential inverter circuit 11A. Also, each of the unit signal transfer gates 60 for the first and second data transfer sections 61 and 62 is implemented as an OR gate 60A. The switches 36 and 65 of the first and second groups are realized as AND gates 36A and 65A, respectively. In addition, an interpolator 33A is provided to obtain an interpolated signal from the clock signal CLK of which the edge has been detected. That is to say, the interpolator 33A and inverters 22b and 22d included in the edge detector 21 together performs the same function as the interpolator 33 shown in FIG. 5.

Figure 9:
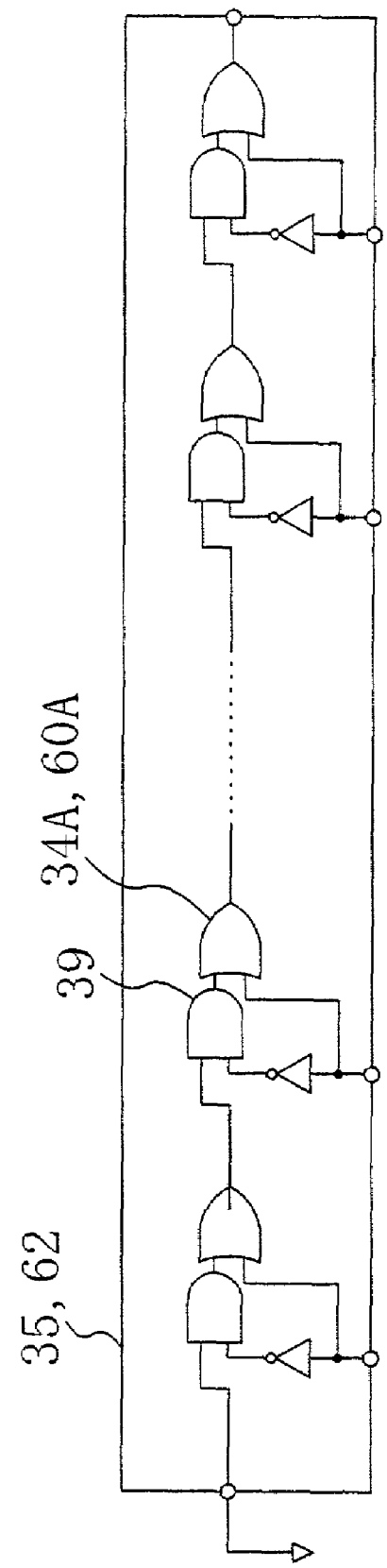
FIG. 9 illustrates an alternative configuration for the selected clock transfer or second data transfer section shown in FIG. 6.

FIG. 9 illustrates an alternative circuit configuration for the selected clock transfer section 35 or second data transfer section 62. In the example illustrated in FIG. 9, an AND gate 39 is inserted between two OR gates 34A and 34A or 60A and 60A. In this configuration, the output of the OR gate 34A or 60A, preceding a terminal at which a signal has been input, is not propagated. Accordingly, it is possible to avoid an unwanted situation where multiple signals are output at a time erroneously.

Embodiment 3

By adding a known PLL circuit to the data extracting circuit of the first or second embodiment, a resulting extracting circuit can extract data from an input signal with any of various data rates covering a wider range and still realizes instantaneous response.

Figure 10:
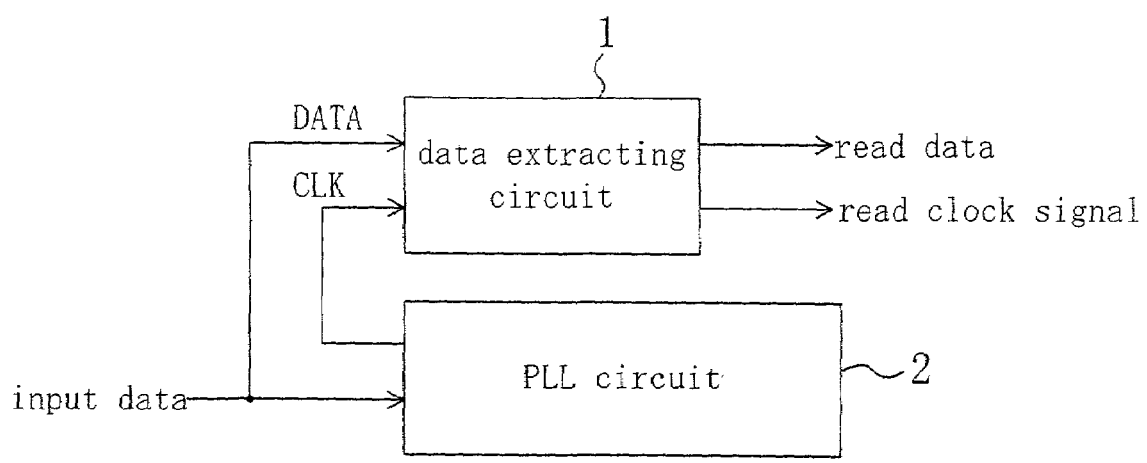
FIG. 10 is a block diagram illustrating a configuration for a data extracting circuit according to a third embodiment of the present invention.

FIG. 10 illustrates a configuration for a data extracting circuit according to a third embodiment of the present invention. The data extracting circuit shown in FIG. 10 includes the extracting circuit 1 of the first or second embodiment and a known PLL circuit 2 in combination. In this configuration, the same data signal DATA is input to the extracting and PLL circuits 1 and 2, and the output clock signal of the PLL circuit 2 is presented as the input clock signal CLK to the extracting circuit 1.

The data extracting circuit of the first or second embodiment realizes instantaneous response to the data signal DATA presented thereto. To realize this fast response, however, the frequency of the clock signal CLK should be preset to about twice as high as the data rate of the data signal DATA. Thus, in the third embodiment, the PLL circuit 2 is used to determine the frequency of the clock signal CLK according to the data rate of the data signal DATA.

Figure 11:
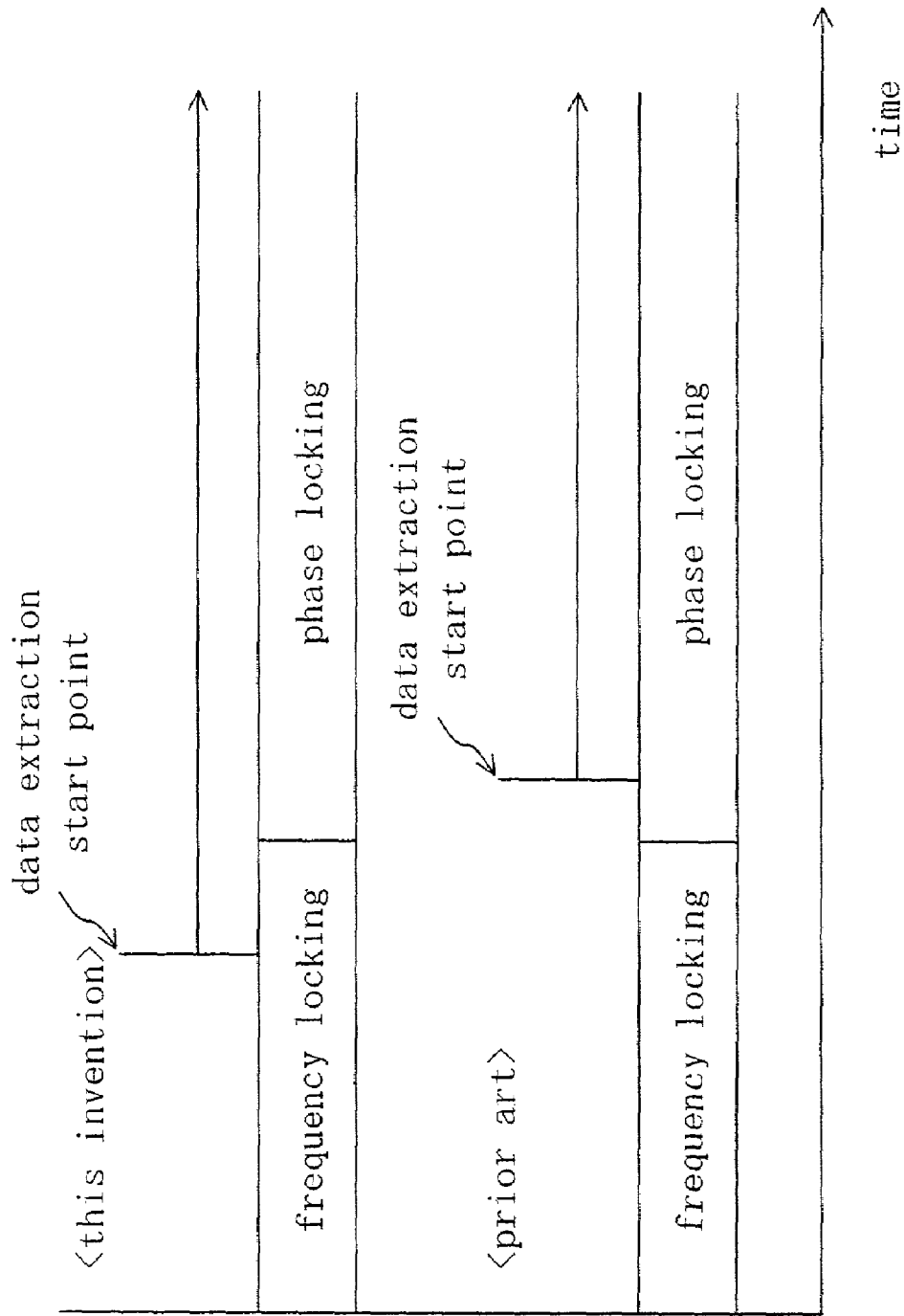
FIG. 11 is a schematic representation illustrating in comparison when the inventive and known data extracting circuits can start their respective data extraction operations.

FIG. 11 is a schematic representation illustrating in comparison when the inventive and known data extracting circuits can start their data extraction operations. The known extracting circuit cannot start extracting data until the data and clock signals have had their phases completely synthesized with each other. In contrast, the extracting circuit of the third embodiment can start extracting data when the clock frequency becomes about twice as high as the data rate of the data signal. Accordingly, as can be seen from FIG. 11, the extracting circuit of the third embodiment can start data extraction earlier than the known circuit.

Embodiment 4

Figure 12:
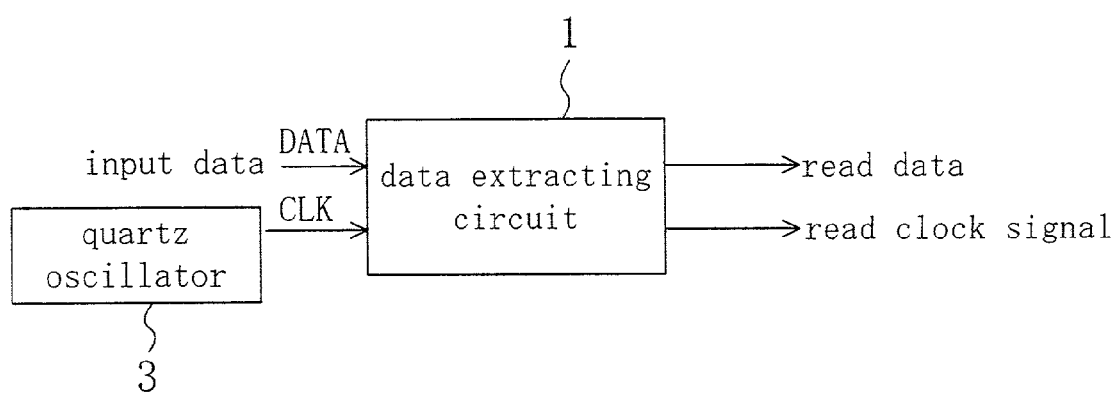
FIG. 12 is a block diagram illustrating a configuration for a data extracting circuit according to a fourth embodiment of the present invention.

FIG. 12 illustrates a configuration for a data extracting circuit according to a fourth embodiment of the present invention. As shown in FIG. 12, a quartz oscillator 3 is used according to the third embodiment as an alternative means for generating the clock signal CLK. In that case, the frequency of the clock signal CLK does not change noticeably. Thus, a data extracting circuit that can respond to the transition of the data signal DATA instantaneously is easily realizable.

In a fiber-optics communications system in general, an optical fiber cable is often used for both data transmission and reception alike. Accordingly, if it takes a long time to switch the modes of operation from transmission into reception, or vice versa, then the data cannot be transferred efficiently enough. In other words, what is now in high demand is a system that can receive data accurately the instant the mode of operation is changed from transmission into reception. Actually, though, it is very difficult for the currently available system to switch the modes of operation instantaneously. For that reason, the conventional system cannot start data extraction until phase locking is accomplished while a known preamble pattern, allocated to the top of received data, is being decoded.

In the real-world communications systems, the data rate of a data signal does not change so steeply. Thus, according to this embodiment, the frequency of the clock signal CLK has almost always been matched to the data rate of the data signal DATA at the start of reception. Accordingly, if there is at least one "1" bit ("H") at the top of the input data, phase locking is accomplishable and data can be extracted instantaneously. This is because the inventive data extracting circuit realizes feed-forward response. That is to say, if the principle of feedback response is utilized as in the prior art, it will take a data period corresponding to several tens of clock cycles to accomplish phase locking. Thus, the data extracting circuit of the fourth embodiment realizes data extraction much faster than the known extracting circuit.

Embodiment 5

In the data extracting circuit of the first or second embodiment, the output clock signal responds instantaneously to the phase shift of the input data. Thus, the circuit can latch the data at the best time. However, this means that the output clock signal also responds unintentionally to the phase jitter of the input data. There is no problem where the first or second embodiment is applied to a system that is not affected by the phase jitter of the output clock signal. But if a given system is affected even by very small phase jitter of the output clock signal, then the extracting circuit of the first or second embodiment is not suitably applicable to that system. In view of these respects, the fifth embodiment of the present invention provides a data extracting system in which the jitter of the output clock signal is much reduced.

Figure 13:
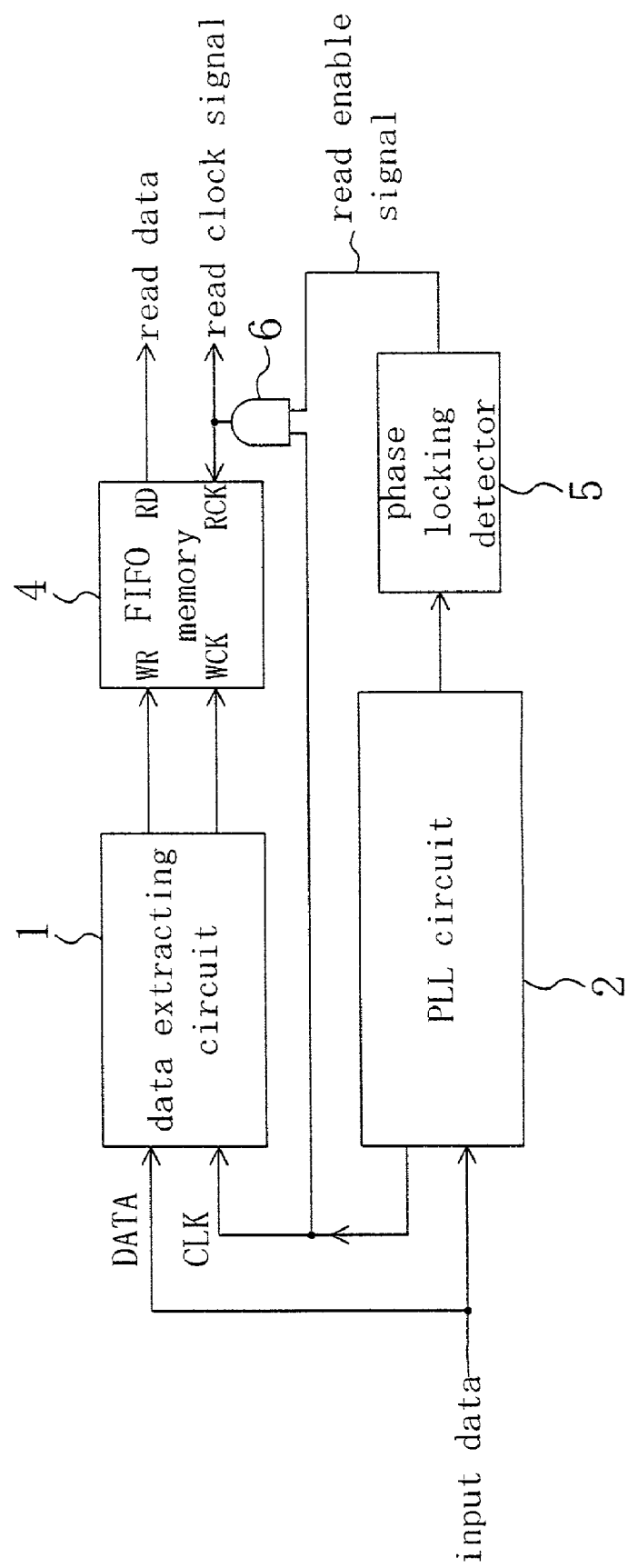
FIG. 13 is a block diagram illustrating an exemplary configuration for a data extracting system according to a fifth embodiment of the present invention.

FIG. 13 illustrates an exemplary configuration for a data extracting system according to the fifth embodiment. As shown in FIG. 13, data output from the data extracting circuit 1 is once written on an FIFO memory 4 responsive to an output clock signal WCK. Then, on detecting phase locking of the PLL 2, a phase locking detector 5 asserts a read enable signal to the "H" level. Thus, the instant the PLL 2 has accomplished phase locking, the output clock signal of the PLL 2 is presented as a read clock signal RCK to the FIFO memory 4 via an AND gate 6 and the data stored on the memory 4 is output as read data RD. Also, the output clock signal of the PLL 2 is provided as the read clock signal RCK. The phase locking detector 5 and the AND gate 6 together constitutes exemplary read enabling means as defined in the claims.

The PLL 2 normally serves as a second- or higher-order low pass filter against phase noise. Accordingly, the phase noise (or jitter) appearing on the output clock signal of the PLL 2 is small. For that reason, where the output clock signal of the PLL 2 is used as the read clock signal RCK as shown in FIG. 13, the read clock signal RCK has small phase noise. Also, if the output data of the extracting circuit 1 is once stored on the FIFO memory 4 and then read out therefrom using the output clock signal of the PLL 2 as the read clock signal RCK, the phase jitter, appearing on the read data signal RD, can be smaller.

Figure 14:
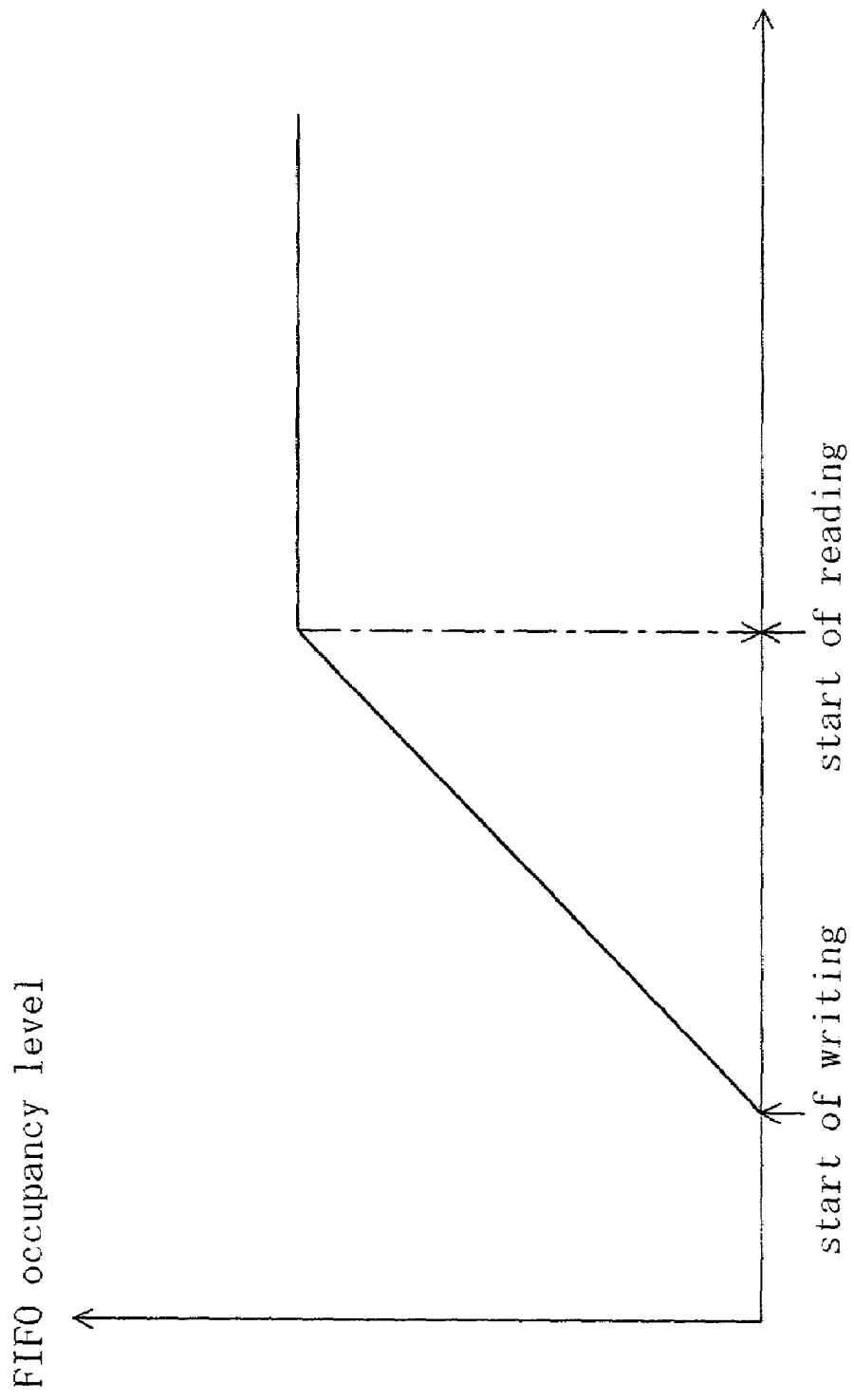
FIG. 14 is a graph illustrating a variation in occupancy level of the FIFO memory shown in FIG. 13.

FIG. 14 is a graph illustrating a variation in occupancy level of the FIFO memory 4 (i.e., the amount of data stored on the FIFO memory 4) with time. In this case, the frequencies of the write and read clock signals WCK and RCK are equal to each other. Thus, the FIFO memory 4 causes neither underflow nor overflow as shown in FIG. 14.

Figure 15:
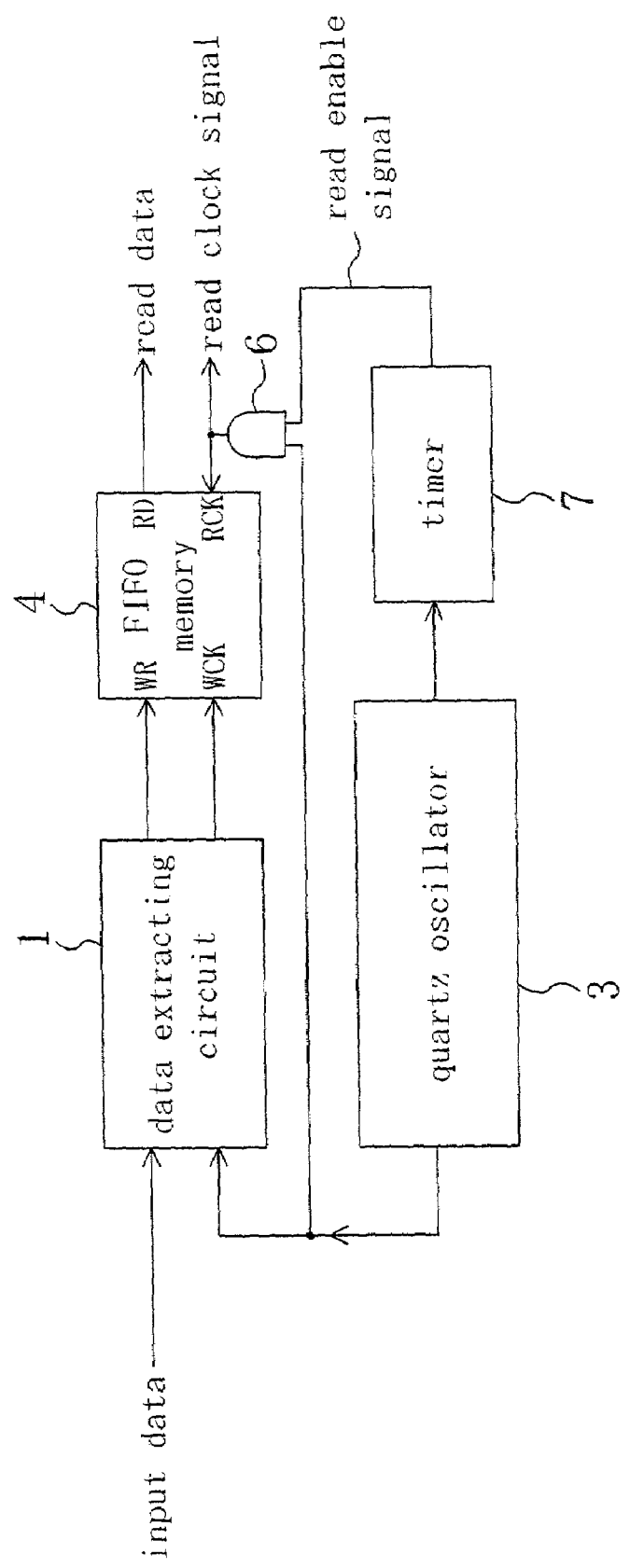
FIG. 15 is a block diagram illustrating another exemplary configuration for a data extracting system according to the fifth embodiment.
Figure 16:
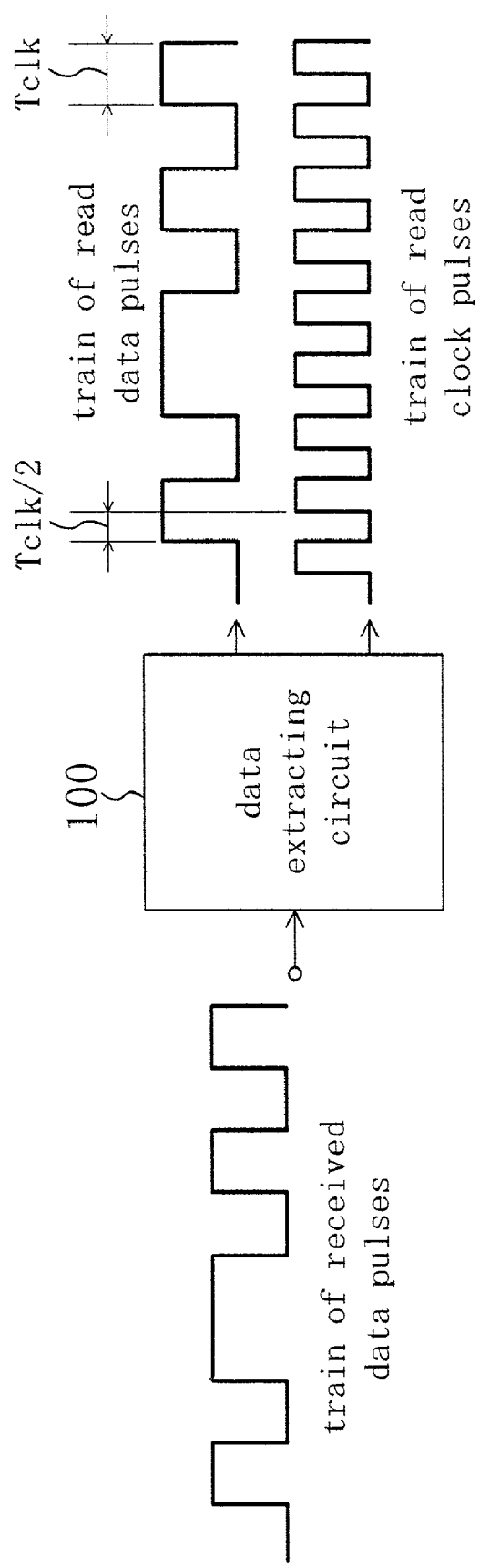
FIG. 16 schematically illustrates functions of a data extracting circuit.
Figure 17:
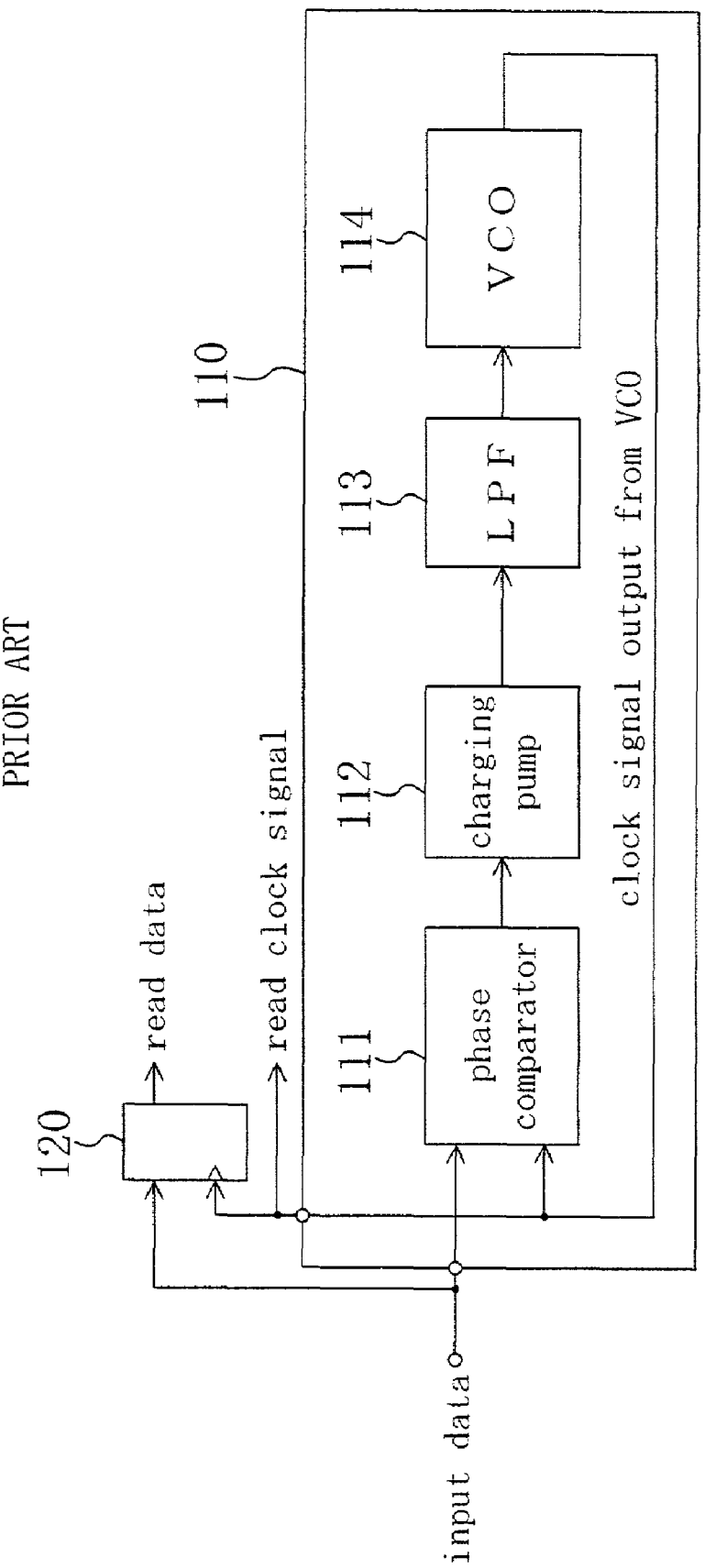
FIG. 17 is a block diagram schematically illustrating a configuration for a known data extracting circuit.
Figure 18A:
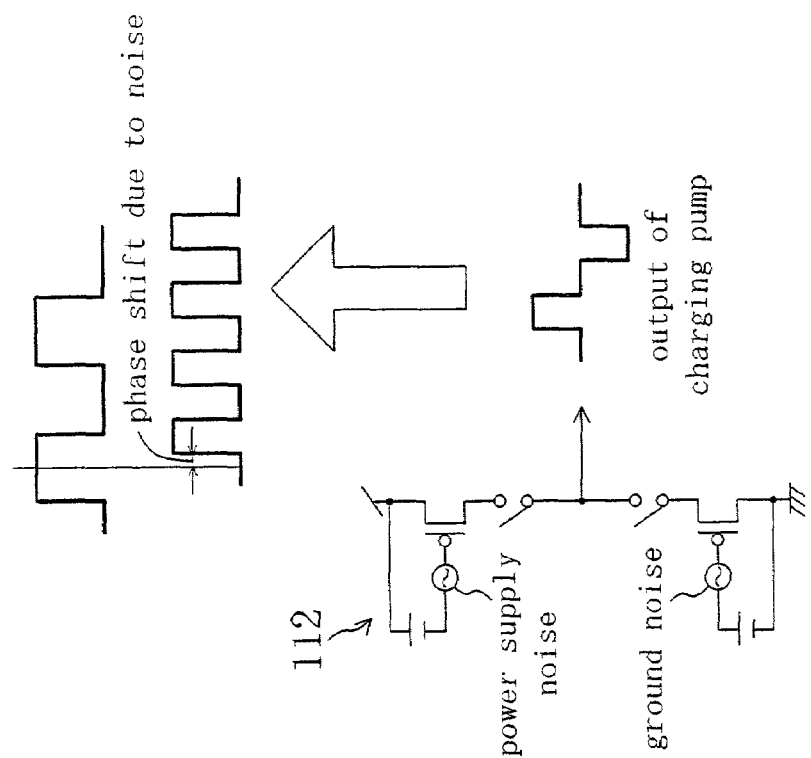
FIGS. 18A and 18B illustrate a problem involved with the known data extracting circuit.
Figure 18B:
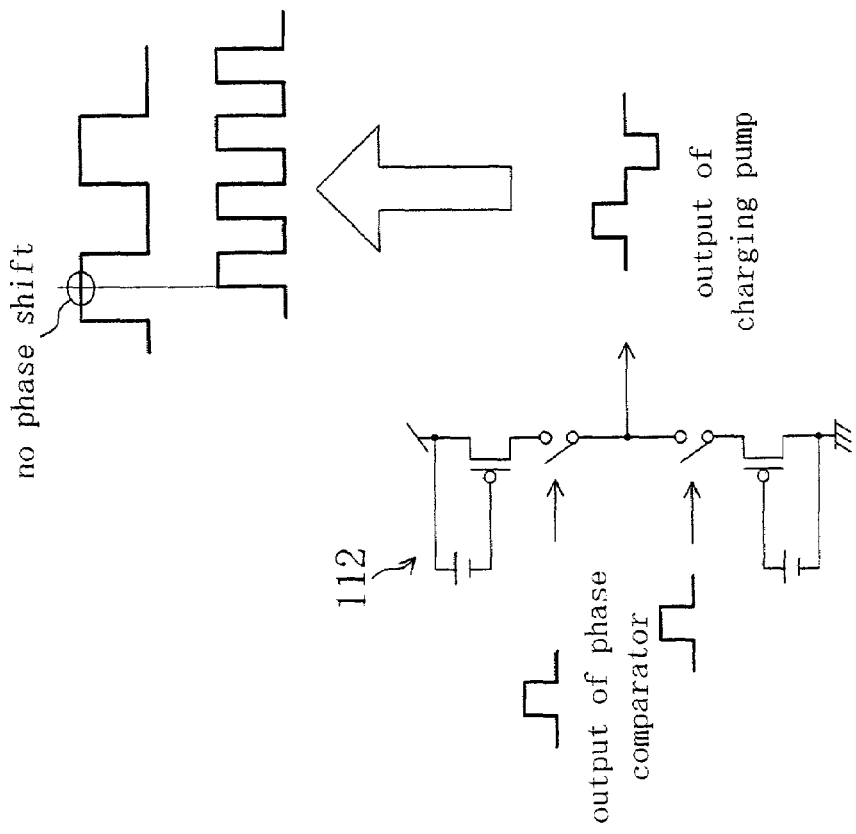

FIG. 15 illustrates another exemplary configuration for a data extracting system according to the fifth embodiment. In the configuration shown in FIG. 15, the quartz oscillator 3 is used instead of the PLL 2. But the system shown in FIG. 15 operates basically the same way as the counterpart illustrated in FIG. 13. In the example illustrated in FIG. 15, the phase locking detector 5 is replaced with a timer 7 to control the read clock signal RCK for the FIFO memory 4. Specifically, when the amount of data that has been written on the FIFO memory 4 reaches a predetermined level, the timer 7 asserts the read enable signal to the "H" level. Thereafter, the output clock signal of the quartz oscillator 3 is presented as the read clock signal RCK to the FIFO memory 4 by way of the AND gate 6. As a result, data RD is read out from the FIFO memory 4. The timer 7 and the AND gate 6 together constitutes another read enabling means.

As is apparent from the foregoing description, the present invention can change the clocking timing instantaneously responsive to the transition of a data signal, thus realizing data extraction with very good responsiveness.

What is claimed is:

1. A data extracting circuit comprising:
a clock transfer section, including multiple unit delay devices connected in series together, for propagating an input clock signal through the delay devices;
an edge detecting section for locating an edge of the clock signal, which edge is being propagated through the clock transfer section, for a time represented by a given edge of an input data signal, and for outputting an edge detection signal indicating the clock signal edge located;
a clock selecting section for selecting one of outputs of the delay devices responsive to the edge detection signal; and
a latch for receiving the output, selected by the selecting section, and the data signal as clock and data inputs, respectively, and for outputting read data;
wherein the selecting section comprises:
multiple switches provided for the respective delay devices, each said switch selectively delivering the output of associated one of the delay devices responsive to the edge detection signal; and
an OR gate tree, in which a plurality of OR gates are connected together like a tree and which receives outputs of the switches.

2. A data extracting circuit comprising:
a clock transfer section, including multiple unit delay devices connected in series together, for propagating an input clock signal through the delay devices;
an edge detecting section for locating an edge of the clock signal, which edge is being propagated through the clock transfer section, for a time represented by a given edge of an input data signal, and for outputting an edge detection signal indicating the clock signal edge located;
a clock selecting section for selecting one of outputs of the delay devices responsive to the edge detection signal; and
a latch for receiving the output, selected by the selecting section, and the data signal as clock and data inputs, respectively, and for outputting read data;
wherein the selecting section comprises multiple interpolators, each said interpolator obtaining an interpolated signal from the output and input of associated one of the delay devices, and selects one of the interpolated signals obtained by the interpolators.

3. A data extracting circuit comprising:
a clock transfer section, including multiple unit delay devices connected in series together, for propagating an input clock signal through the delay devices;
an edge detecting section for locating an edge of the clock signal, which edge is being propagated through the clock transfer section, for a time represented by a given edge of an input data signal, and for outputting an edge detection signal indicating the clock signal edge located;
a first group of switches provided for the respective delay devices, each said switch of the first group selectively delivering the output of associated one of the delay devices responsive to the edge detection signal;
a selected clock transfer section including multiple unit transfer gates that are connected in series together and that receive the outputs of the respective switches of the first group;
a first data transfer section, including multiple unit transfer gates connected in series together, for propagating the input data signal through the transfer gates thereof;
a second group of switches provided for the respective transfer gates of the first data transfer section, each said switch of the second group selecting the output of associated one of the transfer gates responsive to the edge detection signal;
a second data transfer section, including multiple unit transfer gates that are connected in series together and that receive the outputs of the respective switches of the second group; and
a latch for receiving an output of the second data transfer section and an output of the selected clock transfer section as data and clock inputs, respectively, and for outputting read data.

4. The circuit of claim 3, wherein the transfer gates of the first and second data transfer sections have the same configuration as the transfer gates of the selected clock transfer section.

5. The circuit of claim 3, further comprising first delay means for delaying the output of the selected clock transfer section for a predetermined amount of time and then delivering the delayed output to the latch.

6. The circuit of claim 3, further comprising second delay means, provided for the switches of the second group, for delaying the outputs of the transfer gates of the first data transfer section for a predetermined amount of time.

7. The circuit of claim 3, further comprising multiple interpolators, each said interpolator obtaining an interpolated signal from the output and input of associated one of the delay devices of the clock transfer section, wherein each said switch of the first group selects associated one of the interpolated signals obtained by the interpolators.

8. The circuit of claim 3, which uses a clock signal, generated by a PLL circuit, as the input clock signal.

9. The circuit of claim 3, which uses a clock signal, generated by a quartz oscillator, as the input clock signal.

10. A data extracting system comprising:

a data extracting circuit according to claim 3;

a PLL circuit that receives the data signal, which is also input to the data extracting circuit, and that generates and delivers the clock signal to the data extracting circuit;

a FIFO memory that receives the read data and a read clock signal, which have been output from the data extracting circuit, as its input data and input clock signal, respectively; and read enabling means for monitoring a phase locking state of the PLL circuit and for delivering the clock signal, which has been generated by the PLL circuit, as an output clock signal to the FIFO memory when the PLL circuit accomplishes the phase locking.

11. A data extracting system comprising:

a data extracting circuit according to claim 3;

a quartz oscillator that generates and delivers the clock signal to the data extracting circuit;

a FIFO memory that receives the read data and a read clock signal, which have been output from the data extracting circuit, as its input data and input clock signal, respectively; and read enabling means for counting the number of pulses of the clock signal generated by the quartz oscillator and for delivering the clock signal, generated by the quartz oscillator, as an output clock signal to the FIFO memory when the count reaches a predetermined number.

* * * * *